United States Patent [19]

Egging

[11] 4,252,340
[45] Feb. 24, 1981

[54] TANDEM WHEEL SUSPENSION SYSTEM

[76] Inventor: Theodore C. Egging, Gurley, Nebr. 69141

[21] Appl. No.: 17,406

[22] Filed: Mar. 5, 1979

[51] Int. Cl.³ .............................................. B60G 5/04
[52] U.S. Cl. .................................. 280/682; 280/683; 280/711; 280/714
[58] Field of Search .............. 280/682, 683, 690, 714, 280/711, 685, 104; 267/11 R

[56] References Cited

U.S. PATENT DOCUMENTS

| 2,493,024 | 1/1950 | Pointer ................................ 280/685 |
| 3,214,185 | 10/1965 | Mason et al. ........................ 280/711 |
| 3,746,363 | 7/1973 | Borns .................................. 280/690 |

Primary Examiner—Robert R. Song
Attorney, Agent, or Firm—W. Kyle Rost

[57] ABSTRACT

Tandem wheels are carried on arms trailing from a hinge point to a vehicle chassis. The forward wheel trailing arm extends rearwardly of the wheel to termination under an air bag. The rear wheel trailing arm extends forwardly of chassis hinge point to termination on the top side of the same air bag associated with the forward trailing arm. The distance from each hinge point to the air bag is identical, and the distance from each wheel center to the associated hinge point is identical. A mechanical linkage measures the height of the air bag and either supplies additional air to or vents air from the bag, as required, to restore the bag to a predetermined height.

6 Claims, 5 Drawing Figures

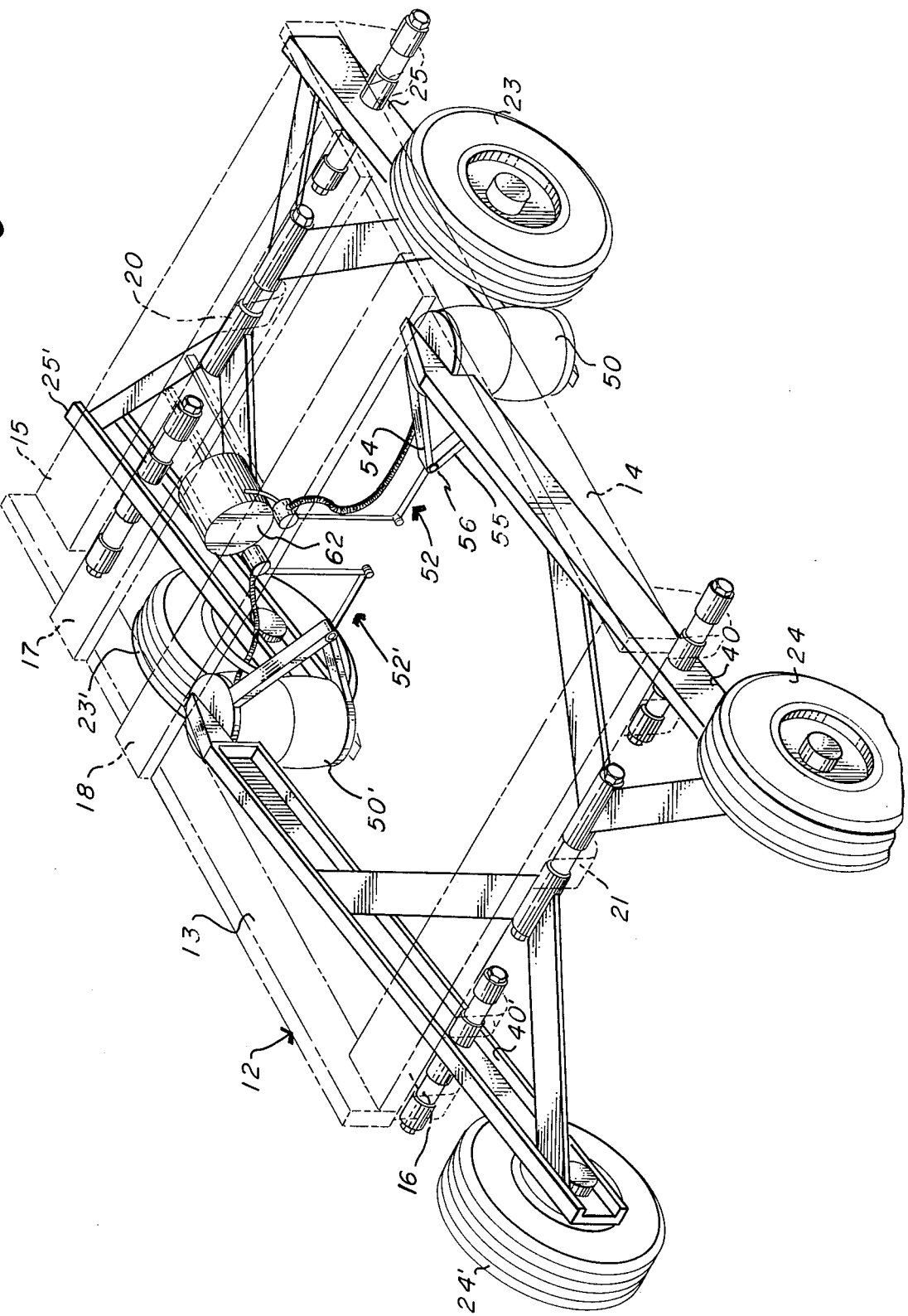

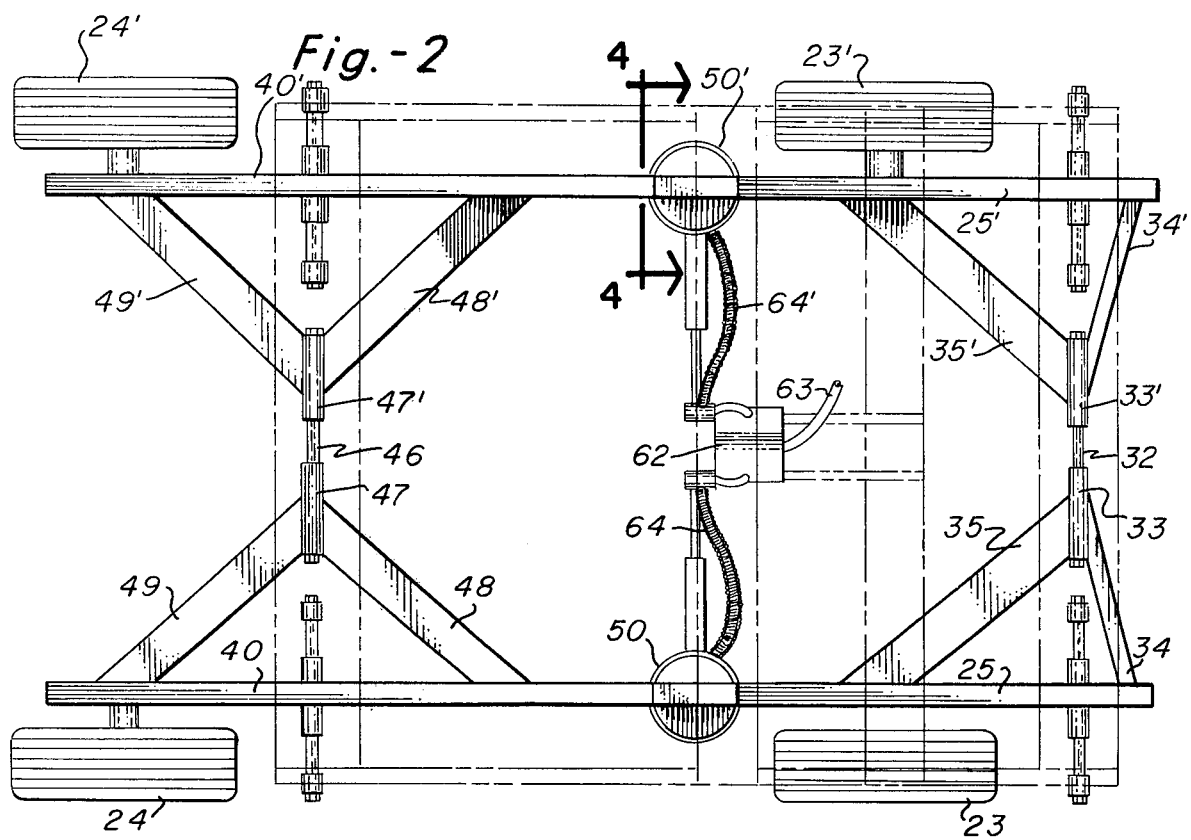
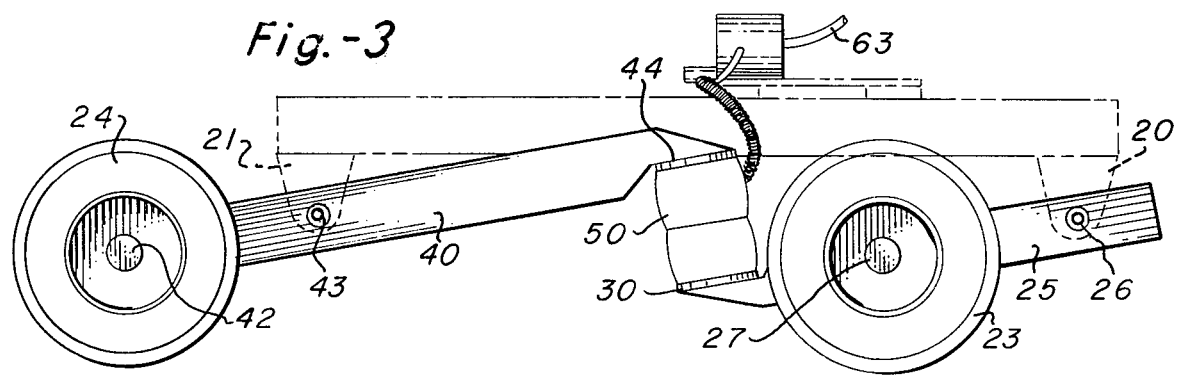
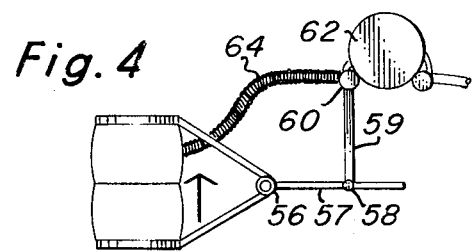
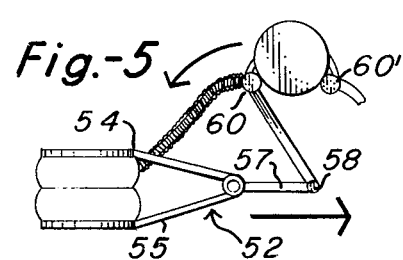

TANDEM WHEEL SUSPENSION SYSTEM

BACKGROUND OF THE INVENTION

1. Field of the Invention

The invention relates generally to land vehicles of the wheeled type. Specifically, the invention relates to fluid suspension and independent suspension systems. A tandem axle suspension system is disclosed that is especially well suited for use on a towed trailer for damping road vibration.

2. Description of the Prior Art

Tandem axle suspension is known in trailers, trucks, busses, and like vehicles. Often the front and rear transversely extending axles of such a system are mounted at opposite ends of a longitudinally extending "rocker arm" or "walking beam", which provides a firm mechanical link between the front and rear axles on each side of the chassis. The walking beam is typically connected to the chassis by a trunnion bearing near its longitudinal center. This arrangement transmits shock between axles and often disturbs the rotational stability of other wheels in the tandem suspension system. Walking beam suspension is known to employ springs and air bags to absorb shock and selective pressure adjustment in air bags is known for the purpose of adjusting the bag characteristics to fit the load.

A variation of the usual walking beam suspension employs a leaf spring supported live forward axle and a walking beam supported rear dead axle, wherein the walking beam has the dead axle at its rear end and an air bag at its forward end such that the air bag may be inflated to pivot the dead axle into a non-load bearing position. This arrangement is for the purpose of reducing vibrations transmitted to the vehicle frame when the load is sufficiently light that the dead axle is not needed.

In any of the described arrangements, the gyroscopic forces generated by a spinning wheel are disrupted when a wheel encounters irregularities in the road. Front and rear wheels often share an unequal portion of the load with the result that one of the tandem axles transmits a stronger vibration to the vehicle chassis than is necessary if the load were equally shared between the tandem axles.

These problems are resolved by providing for equal load sharing between tandem axles under all circumstances and for independent wheel suspension on each axle.

SUMMARY OF THE INVENTION

An independent suspension system employs four or more wheels, each attached to a trail arm connected to the chassis at a point well ahead of the wheel centerline by means of a hinge. The distance from the centerline of the wheel to the hinge point on the trail arm is identical on all wheels. For the front wheel, the trail arm starts at the hinge point and extends rearwardly past the centerline of the wheel to a point half way between the hinge of the front wheel and the hinge of the rear wheel. At this point there is an air bag mounted above the trail arm. For the rear wheel the trail arm extends from the hinge point rearward to the wheel and forward to a point half way between the hinge point of the front and rear wheel, where it is located above the same air bag that is mounted above the front trail arm.

A mechanical linkage attached to the upper and lower air bag mounts and measures the length of the air bag. This linkage is connected to an air valve from a central air supply in such a way that as the load increases, more air is routed to the air bag, and conversely, as the load decreases, air is exhausted.

The main object of the invention is to provide independent suspension for each wheel but to also provide an equalizer between the front and rear wheels. Each wheel is free to travel up and down independently of every other wheel, and it does so in a true plane so that it does not fight or disturb the gyroscopic force of the wheel.

Another object of the invention is to employ load adjusting means such as an air bag to accomplish the multiple functions equalizing load between front and rear wheels stabilizing the vehicle load, and absorbing shock. A single air bag on each side of the vehicle can raise or lower the load independently through inflation or deflation of the bag. The bag supports both wheels on one side of the vehicle at a predetermined height, and also acts as a shock absorber between them.

BRIEF DESCRIPTION OF THE DRAWINGS

FIG. 1 is an isometric view of the suspension system with the chassis in phantom.

FIG. 2 is a top plan view of the suspension system with the chassis in phantom.

FIG. 3 is a side elevational view of the suspension system with the chassis in phantom.

FIG. 4 is a schematic view of the air bag leveling linkage in normal condition.

FIG. 5 is a view similar to FIG. 4 showing the air bag leveling linkage when the chassis is under load.

DESCRIPTION OF THE PREFERRED EMBODIMENT

The suspension system employed in the invention is intended for use with a vehicle chassis of any suitable type, including trucks, trailers, busses, or other load carrying wheeled conveyances. In FIG. 1 a general purpose chassis 12 is illustrated in conjunction with the suspension system. Two pairs of transversely aligned ground engaging wheels are shown in longitudinal tandem relationship. A greater number of pairs of wheels could be employed, and any or all of the wheels may be powered or free-wheeling.

In accordance with FIG. 1, the chassis 12 is constructed with a pair of identical longitudinal frame members 13 and 14, one at either side of the chassis. Members 13 and 14 are transversely joined by front frame member 15 and rear frame member 16, such that members 13, 14, 15 and 16 together form a rectangle. Additional frame members may include transverse stringers 17 and 18 intermediate of members 15 and 16. Chassis 12 is therefore rigid and capable of supporting a substantial cargo load.

With reference to FIGS. 1, 2, and 3, the suspension system is shown to be connected to the chassis, primarily to brackets 20 and 21 depending respectively from members 15 and 16, for example near the transverse center thereof.

The wheels are designated right front wheel 23, left front wheel 23', right rear wheel 24 and left rear wheel 24'. The suspension elements of the right-hand wheels will be described, and it should be understood that the left hand wheels are carried by substantially identical elements in mirror image, designated by identical numbers with the prime symbol added.

Wheel 23 is supported on a longitudinally extending trailing arm 25 having a pivotal connection to the chassis at a designated point 26 in its length. The arm 25 trails the chassis connection to a point 27 at a known distance rearwardly thereof, where wheel 23 is connected to the arm 25 on a transversely extending axis. Arm 25 may continue rearwardly of point 27 for a substantial distance to connecting means 30 for load adjusting means hereafter described. Preferably the distance from point 27 to point 30 is identical to the distance from point 27 to point 26.

In one embodiment, bracket 20 carries axle 32 parallel to the member 15. The righthand end of the axle protrudes from the bracket and carries pivotally mounted sleeve 33 thereon supported on suitable bearings. The sleeve is connected to trailing arm 25 by forwardly angling brace 34 and rearwardly angling brace 35, which support the arm 25 against lateral deformation, as viewed in FIG. 2. Axle 32 is therefore preferred to be stationary and substantially shorter than the wheel track of the chassis. When wheel 23 encounters a bump in the road, it will respond by deflecting in a plane normal to axle 32, causing sleeve 33 to rotate on the axle. The deflective movement of wheel 23 will therefore be understood to be completely independent of the deflective movement of wheel 23'.

Wheel 24 is supported on longitudinally extending arm 40 at a point 42 trailing the point of connection 43 of the arm to the chassis by a predetermined distance. The arm 40 extends forwardly of point 43 for a known distance to connecting means 44 for load ajusting means hereafter described. Preferably the distance from point 42 to 43 is one half the distance from point 43 to 44 and identical to the distance from point 26 to 27.

In one embodiment, bracket 21 carries transversely extending axle 46 similar to axle 32. Sleeve 47 is rotatably mounted on the axle and is joined to arm 40 by forwardly extending brace 48 and rearwardly extending brace 49, similar in function to braces 34 and 35, respectively. Longitudinal arms 25 and 40 may have pivot axles aligned with axles 32 and 46 carried in brackets similar to 20 and 21, respectively, as shown in the drawings.

Load adjusting means such as air bag 50 is mounted between connecting means 30 and 44, and a similar air bag 50' is mounted on the opposite side of the chassis. The air bag may be of conventional design and need not be described in further detail. As best shown in FIGS. 1, 4, and 5, measuring means such as mechanism linkage 52 is connected to bag 50 and measures the length of the bag. The linkage may include upper arm 54 and lower arm 55 connected to the top and bottom of the bag, respectively, at a first end; and pivotally connected together at 56 at their second ends to form a V. A horizontal rod 57 extends from point 56 to a pivotal connection 58 with upwardly extending lever 59, which is the control arm for a three way valve 60. The valve is associated with a supply of compressed air in tank 62, which may be resupplied by conduit 63 for connection to a vehicle engine used with the chassis, or the tank may be refilled as necessary from a stationary source. Air supply hose 64 connects valve 60 to air bag 50.

The operation of the suspension system is best shown by reference to FIG. 3, where it will be observed that both front and rear wheels trail the hinge point 26, 43 of their respective arms to the chassis by an equal distance, and air bag 50 is mounted on arms 25 and 40 at a point equidistant from the two hinge points. A like impact against either wheel will therefore produce a like deflection of the associated trailing arm. However, arm 25 will deflect upwardly against air bag 50, while arm 40 will deflect downwardly against the air bag. In either case, the air bag will damp the deflection partially by its own shock absorbing characteristics and partially by transmitting some of the force to the opposite trailing arm. Accordingly, if wheel 23 raises to pass over an obstruction, wheel 24 assists in raising the chassis, and vice versa. The air bag is acted upon along equal arms 25 and 40 as measured from the hinge points 26 and 43 so that the same assistance is gained through the air bag regardless of which wheel is deflected.

Although the suspension provides for interaction between wheels in the longitudinal direction, the wheels are transversely independent. The use of trailing arms 25 and 40 permits each wheel to independently pivot on axle 32 or 46 during deflection while maintaining rotation in a fixed plane of chassis motion. The gyroscopic forces of rotation are not disturbed and the chassis benefits from fewer vibrations.

Linkage 52 operates to stabilize loads and make the chassis self leveling under differing loads. In the normal condition shown in FIG. 4, valve 60 has sealed hose 64 and the air bag operates with a fixed quantity of contained air. If the chassis becomes more heavily loaded and bag 50 is compressed as shown in FIG. 5, linkage 52 will register the greater loading by partially closing, in turn moving rod 57 to the right in FIG. 5 and thereby tilting lever 59 counterclockwise and turning valve 60 to a position where air from tank 62 is routed through hose 64 to air bag 50. The bag is then inflated until restored to normal height, after which valve 60 is automatically closed. In the opposite case wherein the chassis is lightened, linkage 52 measures the corresponding increase in the height of bag 50 and in turn causes rod 57 to move to the left in FIG. 4, tilting lever 59 clockwise and turning valve 60 to vent bag 50 to the atmosphere. Again, valve 60 is automatically restored to normal position when the bag returns to normal height.

The operation of linkage 52 is fully automatic and operates to compensate for any long term shift in load characteristics. Increased or decreased load is compensated for as explained above, and a laterally unbalanced load or internally shifting load is laterally leveled through the independent operation of the measuring means on bags 50 and 50'.

Although one preferred embodiment of the invention has been described, many variations are possible to accomplish the same function, especially in the structures of the load stabilizer, trailing arms, and support brackets. It has been illustrated in the drawings that each trailing arm is also extending parallel to the longitudinal dimension of the chassis, but other configurations are possible as long as the wheels maintain a trailing condition to the hinge points of the trailing arms to the chassis. Therefore, the disclosure should be understood to be for purposes of example and not limitation.

I claim:

1. In a chassis carrying a forward and rearward pair of transversely aligned ground engaging wheels longitudinally in tandem, the suspension system comprising:
   (a) transversely independent ring and left longitudinally extending front trailing arms, each having a front pivotal connection to said chassis at the forward end thereof, and carrying at least one forward wheel at a first predetermined distance rearwardly of the front chassis connection, and having a first load adjusting means mounting at a second predetermined distance rearwardly of the front chassis connection;
(b) transversely independent right and left longitudinally extending rear trailing arms, each having a rear pivotal connection to said chassis at a point thereon, carrying at least one rearward wheel at a third predetermined distance forwardly of the rear chassis connection;
(c) right and left load adjusting means for variably transversely leveling the chassis and respectively connecting said right rear trailing arm to said right front trailing arm and said left front trailing arm to said left rear trailing arm at their respective load adjusting means mountings; and
(d) wherein said first and third predetermined distances are equal.

2. The suspension system of claim 1, wherein said second and fourth predetermined distances are equal.

3. The suspension system of claim 1, wherein said load adjusting means comprises an air bag.

4. The suspension system of claim 1, further comprising:
(a) measuring means for determining the load applied to said right and left load adjusting means;
(b) compensating means responsive to said measuring means for adjusting the load adjusting means to a predetermined condition.

5. The suspension system of claim 4, wherein said load adjusting means comprises right and left air bags; said measuring means comprises a mechanical linkage connected to said mountings therefor for measuring the height of the bags; and said compensating means comprises a supply of compressed air, associated right and left air valves operatively connected to the air supply and respectively connected to the right and left air bags, and valve operating means responsive to said linkage to vent air from a bag when the height of the bag is greater than said predetermined condition, and to deliver air to the bag from said supply when the height of the bag is less than said predetermined condition.

6. The suspension system of claim 1, further comprising:
(a) a front and rear transverse axle connected to said chassis;
(b) a right and left sleeve carried on the right and left side, respectively, of each axle; and
(c) connecting means joining each sleeve to one of said longitudinally extending trailing arms for independently allowing deflection of the trailing arms on the same axle.

* * * * *